(12) United States Patent
Tripathi et al.

(10) Patent No.: US 7,836,212 B2
(45) Date of Patent: Nov. 16, 2010

(54) REFLECTING BANDWIDTH AND PRIORITY IN NETWORK ATTACHED STORAGE I/O

(75) Inventors: Sunay Tripathi, San Jose, CA (US); William H. Moore, Fremont, CA (US); Brian L. Wong, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 727 days.

(21) Appl. No.: 11/489,936

(22) Filed: Jul. 20, 2006

(65) Prior Publication Data

US 2008/0126580 A1 May 29, 2008

(51) Int. Cl.
*G06F 13/14* (2006.01)

(52) U.S. Cl. .......................................... 710/2; 718/105
(58) Field of Classification Search ................ 707/102, 707/205; 709/201, 203, 229; 710/5, 52, 710/74; 711/114, 118, 154; 714/6
See application file for complete search history.

(56) References Cited

U.S. PATENT DOCUMENTS

| | | | |
|---|---|---|---|
| 6,041,053 A | | 3/2000 | Douceur et al. |
| 6,070,219 A | | 5/2000 | McAlpine et al. |
| 6,163,539 A | | 12/2000 | Alexander et al. |
| 6,477,558 B1 | * | 11/2002 | Irving et al. ................ 718/100 |
| 6,477,643 B1 | | 11/2002 | Vorbach et al. |
| 6,600,721 B2 | | 7/2003 | Edholm |
| 6,714,960 B1 | | 3/2004 | Bitar et al. |
| 6,757,731 B1 | | 6/2004 | Barnes et al. |
| 6,795,928 B2 | * | 9/2004 | Bradley et al. ............... 713/320 |
| 6,831,893 B1 | | 12/2004 | Ben Nun et al. |
| 6,859,841 B2 | | 2/2005 | Narad et al. |
| 6,944,168 B2 | | 9/2005 | Paatela et al. |
| 7,046,665 B1 | | 5/2006 | Walrand et al. |
| 7,177,311 B1 | | 2/2007 | Hussain et al. |
| 7,260,102 B2 | | 8/2007 | Mehrvar et al. |
| 7,313,142 B2 | | 12/2007 | Matsuo et al. |
| 7,437,581 B2 | * | 10/2008 | Grochowski et al. ......... 713/320 |
| 7,549,145 B2 | * | 6/2009 | Aguilar et al. ............... 717/149 |
| 7,562,250 B2 | * | 7/2009 | Wahl et al. ...................... 714/6 |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner*—Cheng-Yuan Tseng
(74) *Attorney, Agent, or Firm*—Osha • Liang LLP

(57) ABSTRACT

A method for processing a first input/output (I/O) request on a network attached storage (NAS) device that includes receiving the first I/O request from a source by the NAS device, placing the first I/O request in an I/O queue associated with the NAS device, wherein the first I/O request is placed in the I/O queue based on a priority of the first I/O request using a remote storage access protocol, and when the first I/O request is associated with the highest priority in the I/O queue, determining whether a bandwidth associated with the source of the first I/O request is exceeded, processing the first I/O request if the bandwidth associated with the source of the first I/O request is not exceeded, and placing the first I/O request in sleep mode if the bandwidth associated with the source of the first I/O request is exceeded.

6 Claims, 4 Drawing Sheets

U.S. PATENT DOCUMENTS

| | | |
|---|---|---|
| 2002/0188733 A1* | 12/2002 | Collins et al. ............... 709/229 |
| 2003/0037154 A1 | 2/2003 | Poggio et al. |
| 2005/0034130 A1* | 2/2005 | Skovira ..................... 718/105 |
| 2005/0086659 A1* | 4/2005 | Huras et al. ................ 718/104 |
| 2005/0135243 A1 | 6/2005 | Lee et al. |
| 2005/0138620 A1 | 6/2005 | Lewites |
| 2006/0041667 A1 | 2/2006 | Ahn et al. |
| 2006/0070066 A1 | 3/2006 | Grobman |
| 2006/0174324 A1 | 8/2006 | Zur et al. |
| 2006/0294412 A1* | 12/2006 | Ahmadian et al. ............ 714/4 |

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

REFLECTING BANDWIDTH AND PRIORITY IN NETWORK ATTACHED STORAGE I/O

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,978; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 1/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,749; "Network Memory Pools for Packet Destinations and Virtual Machines" with U.S. application Ser. No. 11/490,486; "Method and System for Network Configuration for Virtual Machines" with U.S. application Ser. No. 11/489,923; "Multiple Virtual Network Stack Instances" with U.S. application Ser. No. 11/489,929; and "Shared and Separate Network Stack Instances" with U.S. application Ser. No. 1/489,933.

BACKGROUND

Network traffic is transmitted over a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for processing a first input/output (I/O) request on a network attached storage (NAS) device. The method comprises receiving the first I/O request from a source by the NAS device, placing the first I/O request in an I/O queue associated with the NAS device, wherein the first I/O request is placed in the I/O queue based on a priority of the first I/O request using a remote storage access protocol. When the first I/O request is associated with the highest priority in the I/O queue, determine whether a bandwidth associated with the source of the first I/O request is exceeded, process the first I/O request if the bandwidth associated with the source of the first I/O request is not exceeded, and place the first I/O request in sleep mode if the bandwidth associated with the source of the first I/O request is exceeded.

In general, in one aspect, the invention relates to a system for processing an input/output (I/O) request on a network attached storage (NAS) device. The system comprises the NAS device comprising an I/O queue, functionality to execute a remote storage access protocol, and a file system, wherein the NAS device is configured to receive the I/O request from a source, placing the I/O request in the I/O queue based on a priority of the I/O request using the remote storage access protocol. When the I/O request is associated with the highest priority in the I/O queue, determine whether a bandwidth associated with the source of the I/O request is exceeded, process the I/O request if the bandwidth associated with the source of the I/O request is not exceeded, and place the I/O request in sleep mode if the bandwidth associated with the source of the I/O request is exceeded.

In general, in one aspect, the invention relates to a computer usable medium having computer readable program code embodied therein for causing a computer system to execute a method for processing a first input/output (I/O) request on a network attached storage (NAS) device. The method comprises receiving the first I/O request from a source by the NAS device, placing the first I/O request in an I/O queue associated with the NAS device, wherein the first I/O request is placed in the I/O queue based on a priority of the first I/O request using a remote storage access protocol. When the first I/O request is associated with the highest priority in the I/O queue, determine whether a bandwidth associated with the source of the first I/O request is exceeded, process the first I/O request if the bandwidth associated with the source of the first I/O request is not exceeded, and place the first I/O request in sleep mode if the bandwidth associated with the source of the first I/O request is exceeded.

Other aspects of the invention will be apparent from the following description and the appended claims.

DETAILED DESCRIPTION

Figure 1:
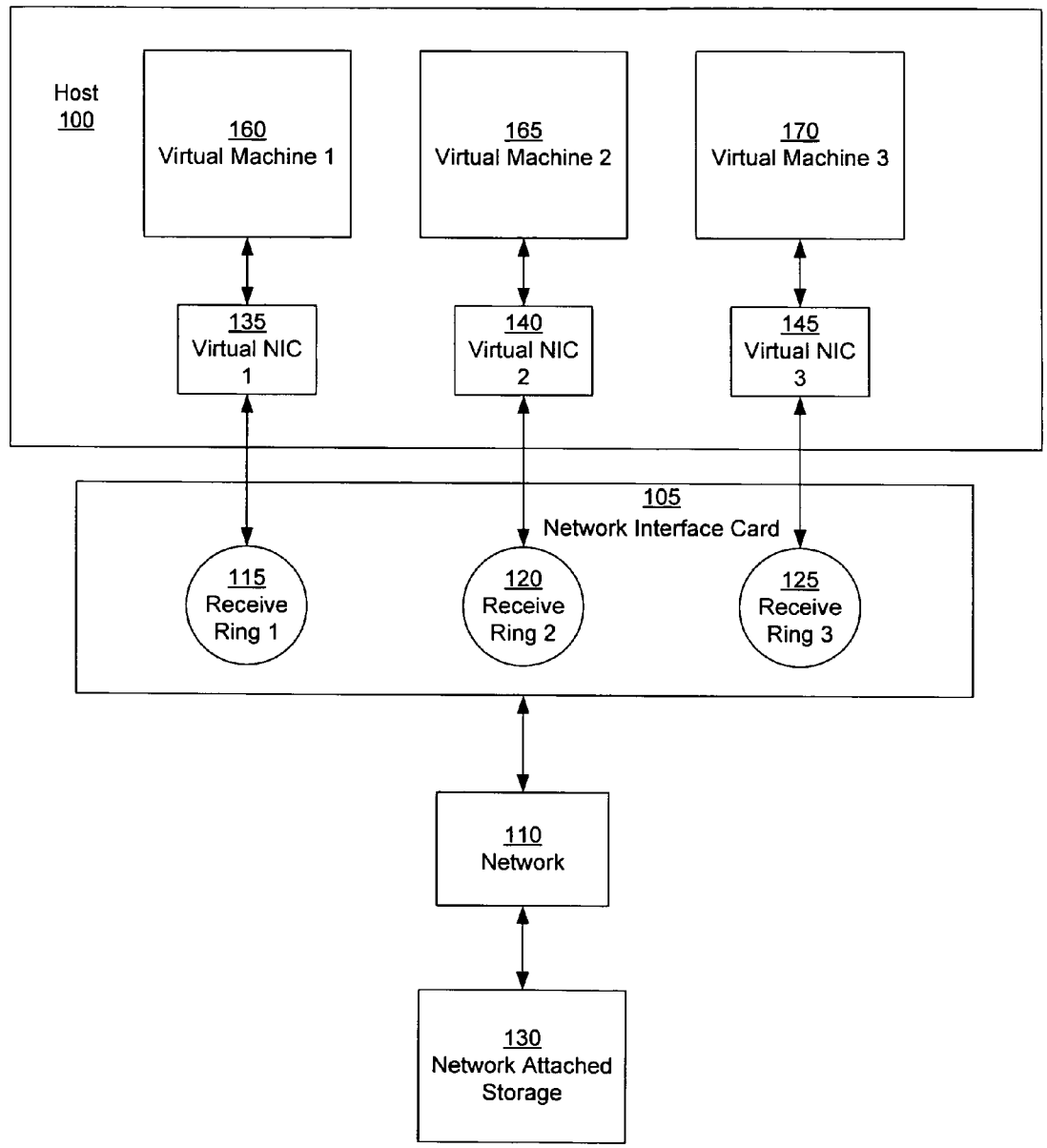
FIGS. 1-2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to synchronize bandwidth and priority in input/output (I/O) requests across a network. In one or more embodiments of the invention, I/O requests across a network involve querying a network attached storage (NAS) device for data or writing data to the NAS device. The NAS device functions as logical file system storage for a Local Area Network (LAN).

Embodiments of the invention provide a method and apparatus to process I/O requests by a NAS device according to priority and bandwidth. The protocol used to access the NAS device is synchronized with the file system on the NAS device so that bandwidth and priority settings are followed for each I/O request. In one or more embodiments of the invention, I/O requests sent to the NAS device are sent by virtual machines, where each virtual machine is associated with a volume on the NAS device. In one embodiment of the invention, the bandwidth and priority settings for each virtual machine are stored on the NAS device, and updates for bandwidth and priority can be sent by the virtual machine in the form of specialized packets.

FIG. 1 shows a schematic diagram of a system in accordance with one or more embodiments of the invention. As shown in FIG. 1, the system includes a host (100), a network interface card (NIC) (105), a network (110), a network attached storage (NAS) device (130), multiple receive rings (e.g., receive ring 1 (115), receive ring 2 (120), receive ring 3 (125)), multiple virtual NICs (e.g., virtual NIC 1 (135), virtual NIC 2 (140), virtual NIC 3 (145)), and multiple virtual machines (e.g., virtual machine 1 (160), virtual machine 2 (165), virtual machine 3 (170)). Each of these components is described below.

The NIC (105) provides an interface between the host (100) and a network (110) (e.g., a local area network, a wide area network, a wireless network, etc.). More specifically, the NIC (105) includes a network interface (NI) (i.e., the hardware on the NIC used to interface with the network (110)). For example, the NI may correspond to an RJ-45 connector, a wireless antenna, etc. The packets received by the NI are then forwarded to other components on the NIC (105) for processing. In one embodiment of the invention, the NIC (105) includes one or more receive rings (e.g., receive ring 1 (115), receive ring 2 (120), receive ring 3 (125)). In one embodiment of the invention, the receive rings (e.g., receive ring 1 (115), receive ring 2 (120), receive ring 3 (125)) correspond to portions of memory within the NIC (105) used to temporarily store packets received from the network (110).

In one or more embodiments of the invention, the host (100) may include a device driver (not shown) and one or more virtual NICs (e.g., virtual NIC 1 (135), virtual NIC 2 (140), virtual NIC 3 (145)). In one embodiment of the invention, the device driver provides an interface between the receive rings (e.g., receive ring 1 (115), receive ring 2 (120), receive ring 3 (125)) and the host (100). More specifically, the device driver (not shown) exposes the receive rings (e.g., receive ring 1 (115), receive ring 2 (120), receive ring 3 (125)) to the host (100). In one embodiment of the invention, each of the virtual NICs (e.g., virtual NIC 1 (135), virtual NIC 2 (140), virtual NIC 3 (145)) is associated with one or more receive rings (e.g., receive ring 1 (115), receive ring 2 (120), receive ring 3 (125)). In other words, a virtual NIC (e.g., virtual NIC 1 (130), virtual NIC 2 (135), virtual NIC 3 (140)) receives incoming packets from a corresponding receive ring(s) (e.g., receive ring 1 (115), receive ring 2 (120), receive ring 3 (125)). In one or more embodiments of the invention, outgoing packets are forwarded from a virtual NIC (e.g., virtual NIC 1 (135), virtual NIC 2 (140), virtual NIC 3 (145)) to a corresponding transmit ring (not shown), which temporarily stores the packet before transmitting the packet over the network (110). In one or more embodiments of the invention, receive rings (e.g., virtual NIC 1 (135), virtual NIC 2 (140), virtual NIC 3 (145)) and transmit rings (not shown) are implemented as ring buffers in the NIC (105).

In one or more embodiments of the invention, the virtual NICs (e.g., virtual NIC 1 (135), virtual NIC 2 (140), virtual NIC 3 (145)) are operatively connected to virtual machines (e.g., virtual machine 1 (160), virtual machine 2 (165), virtual machine 3 (170)) via interfaces (not shown). The virtual NICs (e.g., virtual NIC 1 (135), virtual NIC 2 (140), virtual NIC 3 (145)) provide an abstraction layer between the NIC (105) and the virtual machines (e.g., virtual machine 1 (160), virtual machine 2 (165), virtual machine 3 (170)) on the host (100). More specifically, each virtual NIC (e.g., virtual NIC 1 (135), virtual NIC 2 (140), virtual NIC 3 (145)) operates like a NIC (105). For example, in one embodiment of the invention, each virtual NIC (e.g., virtual NIC 1 (135), virtual NIC 2 (140), virtual NIC 3 (145)) is associated with one or more Internet Protocol (IP) addresses, one or more ports, and configured to handle one or more protocol types. Thus, while the host (100) may be operatively connected to a single NIC (105), virtual machines (e.g., virtual machine 1 (160), virtual machine 2 (165), virtual machine 3 (170)) executing on the host (100) operate as if the host (100) is bound to multiple NICs. Further, each virtual machine (e.g., virtual machine 1 (160), virtual machine 2 (165), virtual machine 3 (170)) has no knowledge of the other virtual machines residing on the host. To each virtual machine (e.g., virtual machine 1 (160), virtual machine 2 (165), virtual machine 3 (170)), the corresponding virtual NIC (e.g., virtual NIC 1 (135), virtual NIC 2 (140), virtual NIC 3 (145)) is indistinguishable from a physical NIC (105). Further, each virtual NIC (e.g., virtual NIC 1 (135), virtual NIC 2 (140), virtual NIC 3 (145)) includes properties of a physical NIC, such as link speed, Media Access Control (MAC) address, etc.

In one embodiment of the invention, each virtual machine ((e.g., virtual machine 1 (160), virtual machine 2 (165), virtual machine 3 (170)) includes a network stack (not shown). Each network stack includes functionality to process packets in accordance with various protocols used to send and receive packets (e.g., Transmission Communication Protocol (TCP), Internet Protocol (IP), User Datagram Protocol (UDP), etc.). Further, each virtual network stack may also include functionality, as needed, to perform additional processing on the incoming and outgoing packets. This additional processing may include, but is not limited to, cryptographic processing, firewall routing, etc.

In one or more embodiments of the invention, the virtual network stacks correspond to network stacks with network layer and transport layer functionality. In one embodiment of the invention, network layer functionality corresponds to functionality to manage packet addressing and delivery on a network (e.g., functionality to support Internet Protocol, Address Resolution Protocol (ARP), Internet Control Message Protocol (ICMP), etc.). In one embodiment of the invention, transport layer functionality corresponds to functionality to manage the transfer of packets on the network (e.g., functionality to support TCP, UDP, Stream Control Transmission Protocol (SCTP), etc.).

As shown in FIG. 1, the host (100) is connected to a network attached storage (NAS) device (130) through the network (110). In one or more embodiments of the invention, the NAS device (130) acts as a logical file system for the virtual machines (e.g., virtual machine 1 (160), virtual machine 2 (165), virtual machine 3 (170)) on the host (100). I/O requests from the virtual machines (e.g., virtual machine 1 (160), virtual machine 2 (165), virtual machine 3 (170)) are sent to the NAS device (130), where they are processed. Data is also sent back to the virtual machines (e.g., virtual machine 1 (160), virtual machine 2 (165), virtual machine 3 (170)) from the NAS device (130) in the form of packets. The NAS device (130) is discussed in FIG. 2.

In one or more embodiments of the invention, each virtual machine (e.g., virtual machine 1 (160), virtual machine 2 (165), virtual machine 3 (170)) is associated with a priority and a bandwidth for I/O requests to the NAS device (130). In one or more embodiments of the invention, the priority and bandwidth are stored in data structures within the NAS device (130). For example, referring to FIG. 1, virtual machine 1 (160) may have a bandwidth of 1 megabyte per second and a priority of "low," virtual machine 2 (165) may have a bandwidth of 10 megabytes per second and a priority of "medium," and virtual machine 3 (170) may have a bandwidth of one gigabyte per second and a priority of "high." Those skilled in the art will appreciate that the aforementioned priorities are relative to each other.

Further, those skilled in the art will appreciate that the bandwidths for the virtual machines are portions of the network (110) bandwidth coming through the NIC (105). Further, those skilled in the art will appreciate that the network (110) bandwidth does not need to be completely divided up among the virtual machines; for example, the three virtual machines could share 50% of the network bandwidth, whereas the other 50% of the network bandwidth is left unallocated.

In one or more embodiments of the invention, I/O requests from a virtual machine (e.g., virtual machine 1 (160), virtual machine 2 (165), virtual machine 3 (170)) are received by the NAS device (130), where they are processed according to priority and bandwidth. Data sent back to each virtual machine (e.g., virtual machine 1 (160), virtual machine 2 (165), virtual machine 3 (170)) is also transmitted at the bandwidth of the virtual machine to prevent overloading or dropped packets. In addition, updates in priority and bandwidth for a virtual machine (e.g., virtual machine 1 (160), virtual machine 2 (165), virtual machine 3 (170)) are sent to the NAS device (130) in the form of specialized packets. A specialized packet updating priority for a virtual machine may be referred to as a priority update message. A specialized packet updating bandwidth for a virtual machine may be referred to as a bandwidth update message. Once the NAS device (130) receives a priority and/or bandwidth update for a particular virtual machine, the NAS device (130) updates the relevant data structures stored internally and processes I/O requests from that virtual machine at the new bandwidth and/or priority.

Figure 2:
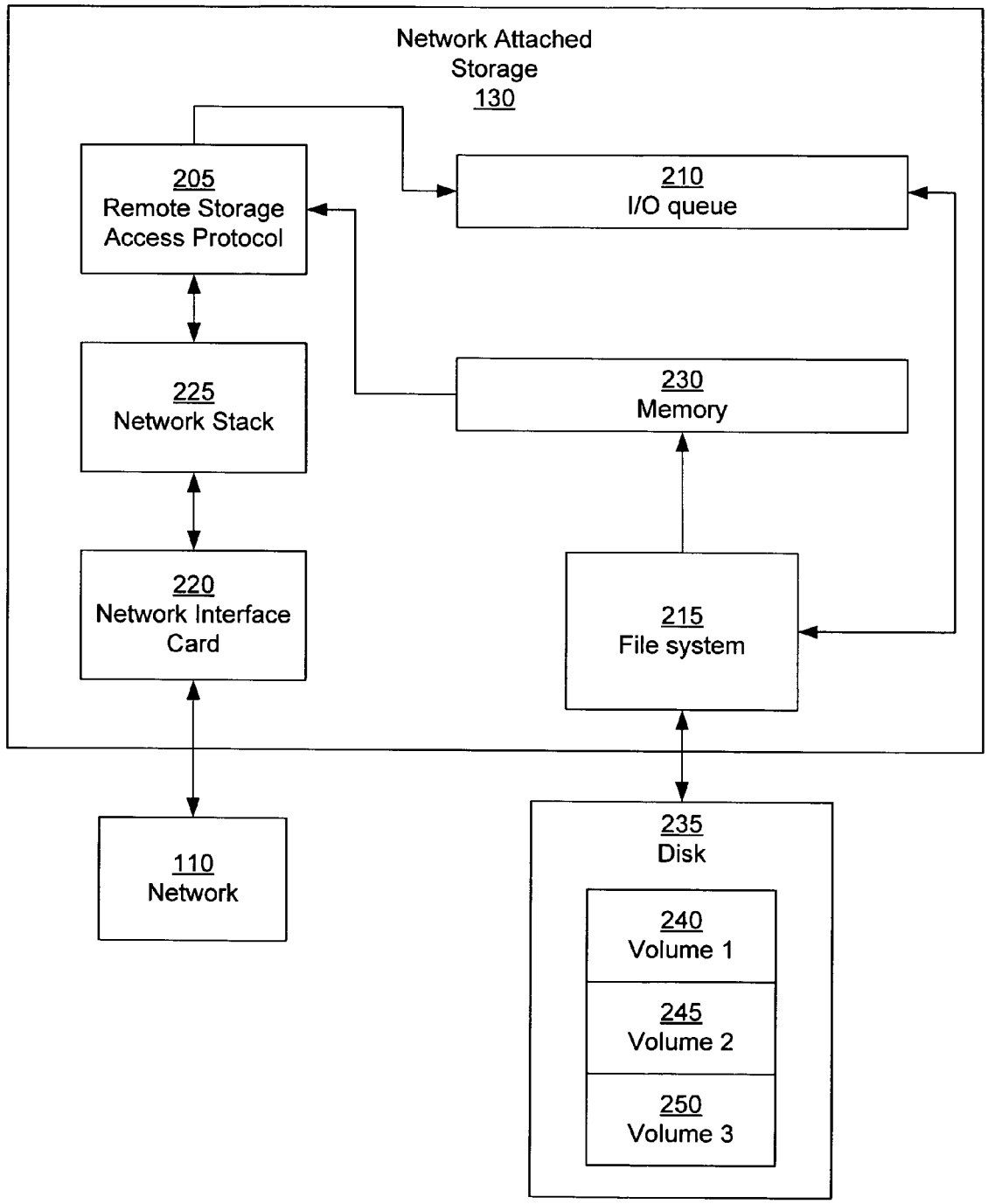

FIG. 2 shows a schematic diagram of a NAS device in accordance with one or more embodiments of the invention. As shown in FIG. 2, the NAS device (130) is connected to a network (110) and a disk (235) and includes a network interface card (NIC) (220), a network stack (225), a remote storage access protocol (205), an I/O queue (210), memory (230), and a file system (215). Hosts and virtual machines on the network (110) are able to send I/O requests to the NAS device (130); in one or more embodiments of the invention, an I/O request involves either a read request for data on the disk (235) or a write request to a volume (e.g., volume 1 (240), volume 2 (245), volume 3 (250)) on the disk (235).

The NIC (220) receives I/O requests in the form of packets from the network (110) and places them in the network stack (225), where the packets are processed. In addition, the NIC receives packets from the network stack (225) and transmits them to the network (110). In one or more embodiments of the invention, the NIC (220) functions as an interface between the NAS device (130) and the network (110).

In one or more embodiments of the invention, the network stack (225) operates like the virtual network stacks discussed in FIG. 1. In other words, the network stack (225) is a software implementation of a networking protocol suite. For example, the network stack (225) may implement HyperText Transfer Protocol (HTTP), TCP, IP, and Ethernet. The network stack (225) may also implement additional protocols, such as UDP, to process the packets. In one or more embodiments of the invention, the network stack (225) implements protocols that allow hosts and virtual machines on the network (110) to communicate with the NAS device (130).

Once the packets have been processed by the network stack (225), the packets are processed by the remote storage access protocol (205). In one or more embodiments of the invention, the remote storage access protocol (205) corresponds to a protocol that allows hosts on the network (110) to access files on the NAS device (130) as if the files were stored on local disks on the hosts. For example, the remote storage access protocol (205) may be Network File System (NFS), Distributed File System (DFS), Internet Small Computer System Interface (iSCSI), or any protocol that allows I/O to occur between hosts and virtual machines on the network (110) and the NAS device (130). In one or more embodiments of the invention, the remote storage access protocol (205) identifies the host or virtual machine that the I/O request originated from and places the I/O request in the I/O queue (210) based on the priority of the host or virtual machine. For example, a high priority virtual machine's I/O requests will be placed closer to the front of the I/O queue than a low priority virtual machine's I/O requests. Alternatively, multiple I/O queues (210) may exist on the NAS device, with each I/O queue (210) configured to handle I/O requests of a particular priority. In such a case, I/O requests are placed in I/O queues (210) according to priority and placed in order of arrival in the appropriate queue. Higher priority I/O queues are processed at a higher rate than lower priority I/O queues.

Once an I/O request reaches the front of the I/O queue (210), the I/O request is processed by the file system (215) on the NAS device (130). The file system (215) may be any file system, such as New Technology File System (NTFS), Zettabyte File System (ZFS), etc. In contrast to the remote storage access protocol (205), the file system (215) is local to the NAS device (130) and manages the files on the disk (235). In one or more embodiments of the invention, the file system (215) processes an I/O request in the I/O queue (210) at the bandwidth of the virtual machine or host that sent the I/O request. As a result, the remote storage access protocol (205) is synchronized with the file system (215), and the remote storage access protocol (205) specifies the bandwidth for processing an I/O request to the file system (215). In one or more embodiments of the invention, the bandwidth and priority associated with a virtual machine or host are stored on the NAS device (130) and accessed by the remote storage access protocol (205), which orders incoming I/O requests based on priority, communicates to the file system (215) the appropriate bandwidth for processing I/O requests at, and sends responses back to the virtual machine or host at the corresponding bandwidth.

The file system (215) processes an I/O request by retrieving data from the disk (235) or writing data to the disk (235). Data read from the disk (235) is placed in memory (230) by the file system (215), where the data is converted to packets and sent to the network (110) by the remote storage access protocol (205). In one or more embodiments of the invention, data is written to memory (230) by the file system (215) at the bandwidth of the virtual machine or host that issued the I/O request, and packets containing the data are sent through the network (110) by the remote storage access protocol (205) at the same bandwidth to avoid exceeding the allocated bandwidth. In one or more embodiments of the invention, if the file system is processing the I/O request at a higher bandwidth than the specified bandwidth, the I/O request is temporarily placed in sleep mode. During this time, the thread processing the I/O request may do something else, such as process the next I/O request in the I/O queue (210). The I/O request is woken up once the bandwidth is no longer exceeded, and processing continues via the sleep/wake cycle until the I/O request is fulfilled.

As shown in FIG. 2, the disk (235) includes multiple volumes (e.g., volume 1 (240), volume 2 (245), volume 3 (250)). In one or more embodiments of the invention, each of the volumes (e.g., volume 1 (240), volume 2 (245), volume 3 (250)) is associated with a virtual machine located on a host connected to the network (110). For example, the volumes (e.g., volume 1 (240), volume 2 (245), volume 3 (250)) may map to the virtual machines of FIG. 1. I/O requests from a particular virtual machine refer to data in the corresponding volume (e.g., volume 1 (240), volume 2 (245), volume 3 (250)). The file system (215) accesses the appropriate volume (e.g., volume 1 (240), volume 2 (245), volume 3 (250)) based on the I/O request and reads or writes data to that volume.

Those skilled in the art will appreciate that the disk (235) may be physically located within the NAS device (130) or stored in a separate physical enclosure and operatively connected to the NAS device (130).

Figure 3:
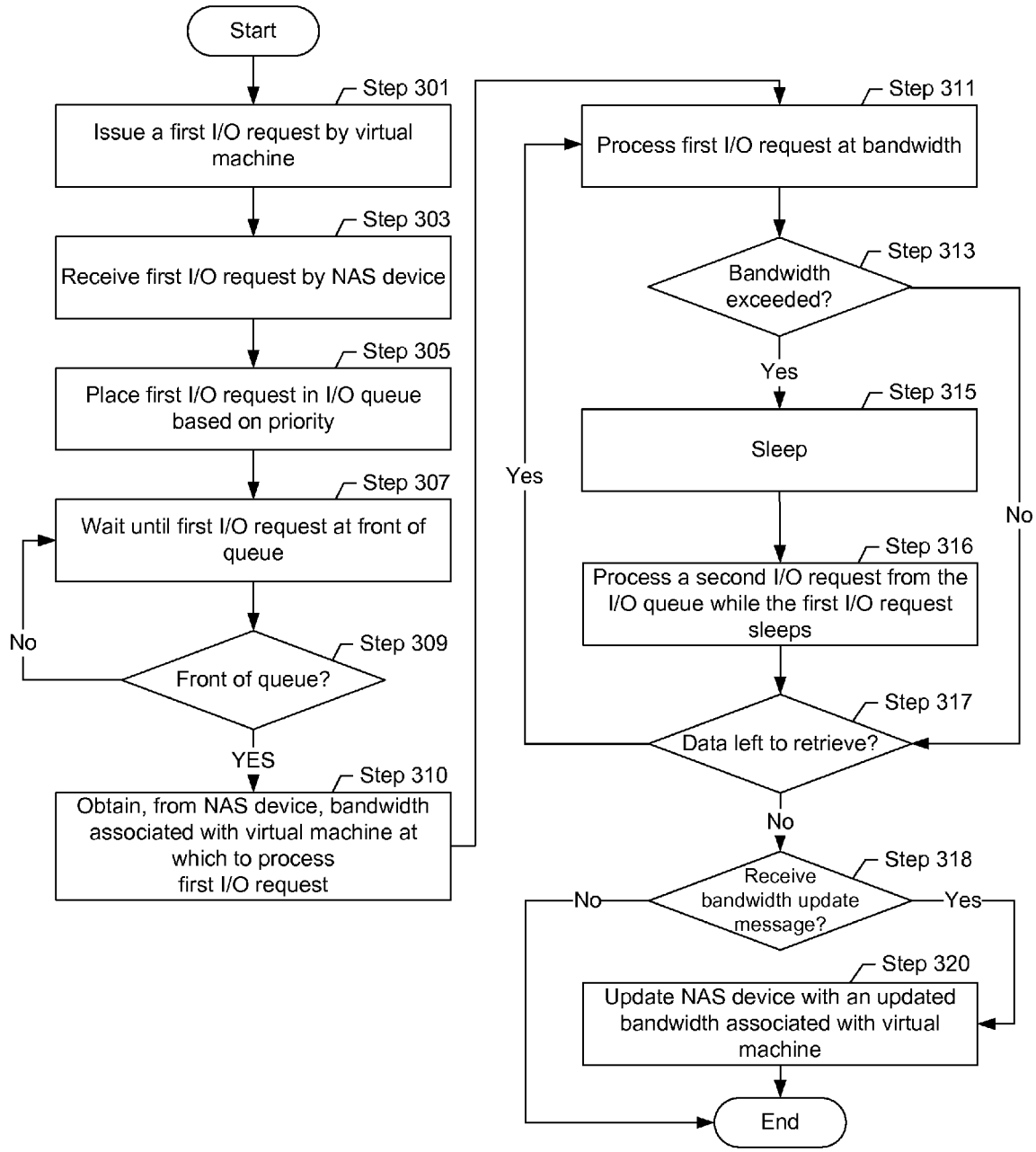
FIG. 3 shows a flow diagram in accordance with one or more embodiments of the invention.

FIG. 3 shows a flow diagram in accordance with one or more embodiments of the invention. First, a first I/O request is issued by a virtual machine (Step 301). As stated above, the first I/O request may be a read or write request for data stored on a NAS device. Next, the first I/O request is transmitted on the network and received by the NAS device (Step 303). The first I/O request is then placed on an I/O queue based on priority (Step 305). In one or more embodiments of the invention, a remote storage access protocol is responsible for determining the priority of the first I/O request and placing the I/O request on the I/O queue based on the priority. In one or more embodiments of the invention, the priority of the first I/O request is the priority of the virtual machine or host that issued the first I/O request.

Once the first I/O request is in the queue, the first I/O request waits to be processed at the front of the queue (Step 307). If the first I/O request has arrived at the front of the queue (Step 309), then the process proceeds to Step 310; if not, the first I/O request continues waiting (Step 307). Those skilled in the art will appreciate that no implicit check may be done; instead, the first I/O request simply sits in the queue until the first I/O request has reached the front of the queue, where it is obtained by a file system thread. Once the first I/O request has reached the front of the I/O queue (i.e., it is the highest priority I/O request in the queue), the file system initiates processing of the first I/O request by obtaining from the NAS device the bandwidth associated with the virtual machine at which to process the first I/O request (Step 310). The first I/O request is then processed at the specified bandwidth (Step 311). In one or more embodiments of the invention, the bandwidth is provided by the remote storage access protocol on the NAS device and stored on a data structure in the NAS device. In one or more embodiments of the invention, the specified bandwidth is the bandwidth of the virtual machine or host that issued the first I/O request. As stated above, the first I/O request is processed by the file system on the NAS device. For example, if the bandwidth of a virtual machine is 10 megabytes per second, the file system processes I/O requests from that virtual machine at 10 megabytes per second, even if the file system is capable of processing I/O requests much more quickly.

To process the first I/O request at the specified bandwidth, a determination is periodically made about whether the bandwidth has been exceeded (Step 313). If not, a determination is made about whether data needs to be retrieved (Step 317). If not, the first I/O request is complete. If so, the file system continues processing the first I/O request (Step 311) at the specified bandwidth. In one or more embodiments of the invention, data retrieved for I/O requests is not buffered in the NAS device. As a result, I/O requests are processed at the bandwidth of the issuing virtual machine so that memory is conserved and responses can be received at the appropriate rate by the virtual machine.

If the bandwidth has been exceeded, a sleep mode is entered (Step 315), where the first I/O request is temporarily paused. As stated above, the thread processing the first I/O request may then process another I/O request (i.e., a second I/O request from the I/O queue) while the first I/O request is asleep (Step 316); after a period of time, the first I/O request wakes up and checks if there is any data left to retrieve (Step 317). If not, the first I/O request is completed, and if so, the first I/O request continues to be processed at bandwidth (Step 311).

A bandwidth update message may be transmitted from the virtual machine to the NAS device (Step 318). If a bandwidth update message is received by the NAS device, then the NAS device may be updated with an updated bandwidth for the virtual machine (Step 320).

Those skilled in the art will appreciate that processing at bandwidth may be implemented by cycling through sleep and wake periods that maintain the bandwidth of the I/O request instead of checking the processing rate explicitly. For example, if the virtual machine has a bandwidth of 1 gigabyte per second and the file system and associated disk can process I/O requests at 5 gigabytes per second, then the I/O request may be broken down into multiple smaller I/O requests. The multiple smaller I/O requests would be processed such that one of the smaller I/O requests would be processed followed by a period during which the thread handling the I/O request sleeps. This processes is repeated until the I/O request is serviced. By interleaving the smaller I/O requests with periods during which the thread handling the I/O request sleeps, the I/O request is effectively processed at a slower 1 gigabyte per second (i.e., at the bandwidth associated with the virtual machine).

As an alternative to processing the I/O requests sequentially, multiple I/O requests may be processed in parallel. For example, in one or more embodiments of the invention, a file system thread may alternate between multiple bandwidth-limited I/O requests. For example, if the thread can process I/O requests (i.e. read/write data from/to the disk) at 10 gigabytes per second, the thread could process three I/O requests with bandwidths of 3 gigabytes per second, as well as one I/O request with a bandwidth of one gigabyte per second. The thread may alternate between sleep and wake cycles of the I/O requests; when one I/O request is processed, the others are asleep. Using the examples above, the three I/O requests at 3 gigabytes per second are each processed 3 times as often as the I/O request at one gigabyte per second, such that the processing takes place at the bandwidth of the I/O request. With a processing speed of 10 gigabytes per second, each of the 3 gigabyte per second I/O requests are processed at their bandwidths, and the 1 gigabyte per second I/O request is also processed at its bandwidth.

Figure 4:
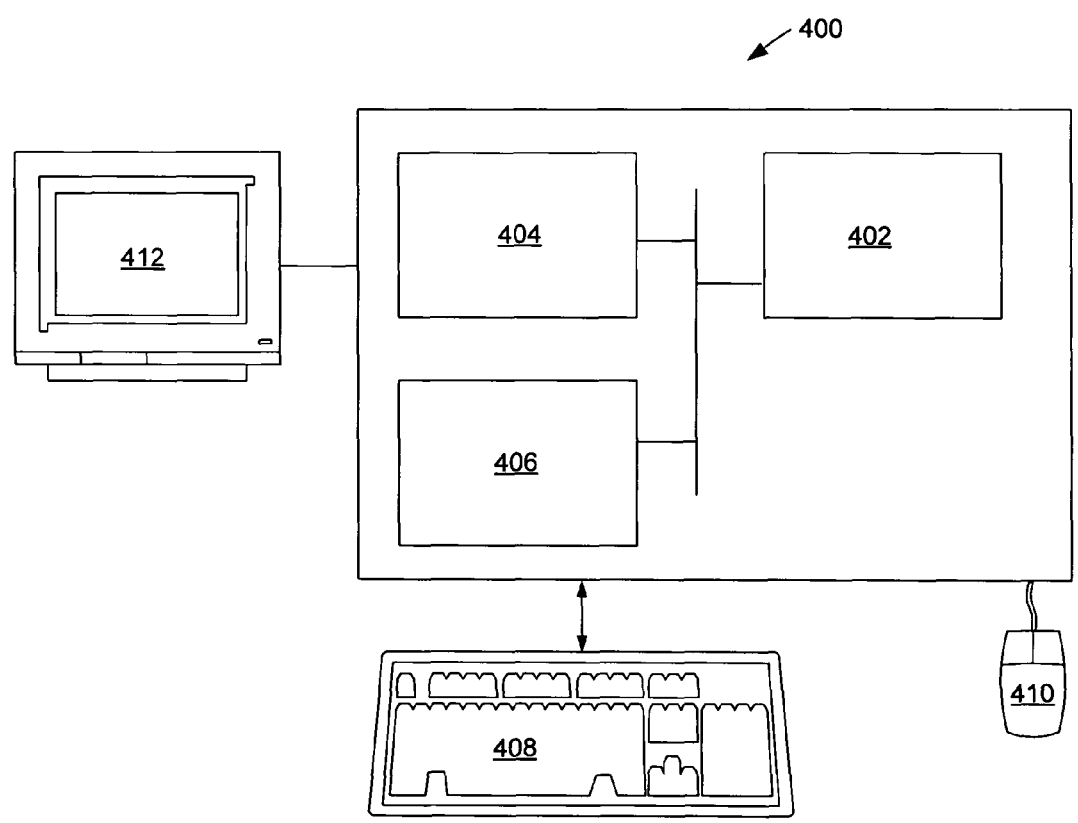
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., NAS device, host, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a first input/output (I/O) request on a network attached storage (NAS) device, comprising:
   receiving the first I/O request from a first virtual machine by the NAS device;
   placing the first I/O request in an I/O queue associated with the NAS device, wherein the first I/O request is placed in the I/O queue based on a priority of the first I/O request using a remote storage access protocol; and
   when the first I/O request is associated with the highest priority in the I/O queue:
      determining whether a bandwidth associated with the first virtual machine is exceeded;
      processing the first I/O request if the bandwidth associated with the first virtual machine is not exceeded;
      placing the first I/O request in sleep mode if the bandwidth associated with the first virtual machine is exceeded;
      removing the first I/O request from sleep mode after a specified time interval;
      re-assessing whether the bandwidth associated with the first virtual machine is exceeded;
      processing the first I/O request if the bandwidth associated with the first virtual machine is not exceeded; and
      returning the first I/O request to sleep mode if the bandwidth associated with the first virtual machine is exceeded,
   wherein the bandwidth associated with the first virtual machine is stored on the NAS device,
   wherein the bandwidth associated with the first virtual machine is updated when a bandwidth update message is transmitted to the NAS device from the first virtual machine, and
   wherein a second I/O request received from a second virtual machine is processed at a bandwidth associated with the second virtual machine when the first I/O request is placed in sleep mode.

2. A system for processing an input/output (I/O) request on a network attached storage (NAS) device, comprising:
   the NAS device, comprising:
      an I/O queue;
      functionality to execute a remote storage access protocol; and
      a file system;
   wherein the NAS device is configured to:
      receive the I/O request from a first virtual machine;
      placing the I/O request in the I/O queue based on a priority of the I/O request using the remote storage access protocol; and
      when the I/O request is associated with the highest priority in the I/O queue:
         determine whether a bandwidth associated with the source of the I/O request is exceeded;
         process the I/O request if the bandwidth associated with the first virtual machine is not exceeded;
         place the I/O request in sleep mode if the bandwidth associated with the first virtual machine is exceeded;
         remove the I/O request from sleep mode after a specified time interval;
         re-assess whether the bandwidth associated with the first virtual machine is exceeded;
         process the I/O request if the bandwidth associated with the first virtual machine is not exceeded; and
         return the I/O request to sleep more if the bandwidth associated with the first virtual machine is exceeded,
   wherein the bandwidth associated with the first virtual machine is stored on the NAS device,
   wherein the bandwidth associated with the first virtual machine is updated when a bandwidth update message is transmitted to the NAS device from the first virtual machine, and
   wherein a second I/O request received from a second virtual machine is processed at a bandwidth associated with the second virtual machine when the first I/O request is placed in sleep mode.

3. A non-transitory computer usable medium having computer readable program code embodied therein for causing a computer system to execute a method for prosecuting a first input/output (I/O) request on a network attached storage (NAS) device, the method comprising:
   receiving the first I/O request from a first virtual machine by the NAS device;
   placing the first I/O request in an I/O queue associated with the NAS device, wherein the first I/O request is placed in the I/O queue based on a priority of the first I/O request using a remote storage access protocol; and
   when the first I/O request is associated with the highest priority in the I/O queue:
      determining whether a bandwidth associated with the first virtual machine is exceeded;
      processing the first I/O request if the bandwidth associated with the first virtual machine is not exceeded;
      placing the first I/O request in sleep mode if the bandwidth associated with the first virtual machine is exceeded;
      removing the first I/O request from sleep mode after a specified time interval;
      re-assessing whether the bandwidth associated with the first virtual machine is exceeded;
      processing the first I/O request if the bandwidth associated with the first virtual machine is not exceeded; and
      returning the first I/O request to sleep mode if the bandwidth associated with the first virtual machine is exceeded,
   wherein the bandwidth associated with the first virtual machine is stored on the NAS device,
   wherein the bandwidth associated with the first virtual machine is updated when a bandwidth update message is transmitted to the NAS device from the first virtual machine, and
   wherein a second I/O request received from a second virtual machine is processed at a bandwidth associated with the second virtual machine when the first I/O request is placed in sleep mode.

4. The method of claim 1, wherein the virtual machine is associated with a volume operatively connected to the NAS device.

5. The system of claim 2, further comprising:
   a volume operatively connected to the NAS device, wherein the virtual machine is associated with the volume.

6. The non-transitory computer usable medium of claim 3, wherein the virtual machine is associated with a volume operatively connected to the NAS device.

* * * * *